US012636781B2

(12) United States Patent
Arita et al.

(10) Patent No.: US 12,636,781 B2
(45) Date of Patent: May 26, 2026

(54) CONTROL DEVICE AND ROBOT SYSTEM

(71) Applicant: FANUC CORPORATION, Yamanashi (JP)

(72) Inventors: Soichi Arita, Yamanashi (JP);
Kenichiro Oguri, Yamanashi (JP);
Kazuki Sawada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 18/001,586

(22) PCT Filed: Jul. 27, 2021

(86) PCT No.: PCT/JP2021/027780
§ 371 (c)(1),
(2) Date: Dec. 12, 2022

(87) PCT Pub. No.: WO2022/025072
PCT Pub. Date: Feb. 3, 2022

(65) Prior Publication Data
US 2023/0302639 A1     Sep. 28, 2023

(30) Foreign Application Priority Data

Jul. 31, 2020     (JP) ................................. 2020-130903

(51) Int. Cl.
*B25J 9/16* (2006.01)
*B25J 13/08* (2006.01)
*B25J 9/04* (2006.01)

(52) U.S. Cl.
CPC .......... *B25J 9/1651* (2013.01); *B25J 13/088* (2013.01); *B25J 9/042* (2013.01); *B25J 9/1628* (2013.01); *B25J 13/089* (2013.01)

(58) Field of Classification Search
CPC ........ B25J 9/1651; B25J 9/042; B25J 13/088; B25J 13/089; B25J 9/1628
See application file for complete search history.

(56) References Cited

U.S. PATENT DOCUMENTS 4,984,959 A     1/1991     Kato
5,201,239 A     4/1993     Bundo et al.
(Continued)

FOREIGN PATENT DOCUMENTS

CN     102029608 A     4/2011
CN     105965505 A     9/2016
(Continued)

OTHER PUBLICATIONS

Grossard, M., et al., "Control-Oriented Design and Robust Decentralized Control of the CEA Dexterous Robot Hand", Aug. 2015, IEEE/ASME Transactions on Mechatronics, vol. 20, No. 4, pp. 1809-1821 (Year: 2015).*

*Primary Examiner* — Abby Lin
*Assistant Examiner* — Karston G. Evans
(74) *Attorney, Agent, or Firm* — HAUPTMAN HAM, LLP

(57) ABSTRACT

A control device for controlling a machine with axes having a corotational relation includes: axis position detectors; motor position detectors; a position command calculation unit calculating a position command for each of the axes based on an operation program; a position control unit outputting a speed command of each motor based on the position command and the detection position of the corresponding axis; a speed control unit controlling each motor based on the speed command; and a correction value calculation unit calculating a correction value for correcting, based on the corotational relation, the speed command of a motor with a to-be-controlled axis which is an axis rotating dependent on the corotational relation. The speed control (Continued)

unit corresponding to the to-be-controlled axis corrects the speed command based on the correction value so as to be applied to control of the motor with the to-be-controlled axis.

4 Claims, 6 Drawing Sheets

(56)                    References Cited

U.S. PATENT DOCUMENTS

| | | | | |
|---|---|---|---|---|
| 5,216,222 | A * | 6/1993 | Masuda | B23K 26/10 |
| | | | | 219/121.79 |
| 2012/0215353 | A1 * | 8/2012 | Izumi | B25J 9/1641 |
| | | | | 700/254 |
| 2019/0022860 | A1 | 1/2019 | Kishi et al. | |
| 2020/0180149 | A1 * | 6/2020 | Tsuboi | B25J 9/126 |

FOREIGN PATENT DOCUMENTS

| | | | |
|---|---|---|---|
| CN | 106863347 | A | 6/2017 |
| DE | 112012006256 | B4 | 11/2015 |
| JP | H3-281083 | A | 12/1991 |
| JP | H06063884 | A | 3/1994 |
| JP | 2000-785 | A | 1/2000 |
| JP | 2008-272873 | A | 11/2008 |
| WO | 2019012942 | A1 | 1/2019 |

* cited by examiner

FIG. 2

CONTROL DEVICE AND ROBOT SYSTEM

RELATED APPLICATIONS

The present application is a National Phase of International Application No. PCT/JP2021/027780 filed Jul. 27, 2021, which claims priority to Japanese Application No. 2020-130903, filed Jul. 31, 2020.

TECHNICAL FIELD

The present invention relates to a controller and a robot system.

BACKGROUND ART

An operation of an articulated robot is controlled through servo control on a servomotor provided to each articulated axis. Patent Literature 1 describes an example of a controller for such an articulated robot.

CITATION LIST

Patent Literature

Patent Literature 1: WO 2019/012942

SUMMARY OF INVENTION

Technical Problem

There is a control scheme using, as feedback information, motor position/speed information from an encoder of a servomotor provided to each articulated axis of an articulated robot. Such a scheme is also known as a semi-closed control scheme. There is a control scheme that achieves higher accuracy for the operation control by using, as the feedback information, arm (axis) position information from an encoder that detects the position (angle) of the arm (axis) and is provided to each articulated axis. Such a control scheme is also known as a full-closed control scheme. In a machine including a plurality of axes such as an articulated robot, some of the plurality of axes may be in a corotation relationship, meaning that one of such axes rotates in conjunction with an operation of another one of such axes. There has been a demand for a controller and a robot system with which control can be performed under an appropriate full-closed control scheme, even when there are axes in a corotation relationship.

Solution to Problem

An aspect of the present disclosure is a controller configured to control an operation of a machine including a plurality of axes in a corotation relationship in which rotation of one of the plurality of axes causes rotation of another one of the plurality of axes, the controller including an axis position detector configured to detect a position of each of the plurality of axes, a motor position detector configured to detect a position of each of a plurality of motors configured to drive the plurality of respective axes, a position command calculating unit configured to calculate a position command for each of the plurality of axes, in accordance with an operation program, a position control unit configured to output a speed command for each of the motors corresponding to the plurality of respective axes, based on the position command and detected positions of the plurality of respective axes, a speed control unit configured to control the respective motors based on the speed command, and a correction value calculating unit configured to calculate a correction value for correcting, based on the corotation relationship, the speed command for one of the motors corresponding to a control target axis that is an axis, among the plurality of axes, rotating depending on the corotation relationship, wherein the speed control unit that corresponds to the control target axis corrects, based on the correction value, the speed command for the motor corresponding to the control target axis, and applies the corrected speed command to control for the motor corresponding to the control target axis.

Another aspect of the present disclosure is a robot system including the controller and an articulated robot having a configuration of the machine described above.

Effects of Invention

With the configuration described above, even when a plurality of axes are in a corotation relationship, the control taking into account the corotation relationship can be applied to the control for a control target axis, whereby the performance of position control for a machine can be improved.

These objects, features and advantages and other objects, features and advantages of the present invention will be further clarified from the detailed description of typical embodiments of the present invention illustrated in the accompanying drawings.

BRIEF DESCRIPTION OF DRAWINGS

FIG. 2 is a functional block diagram of the robot controller and a robot.

DESCRIPTION OF EMBODIMENTS

Figure 1:
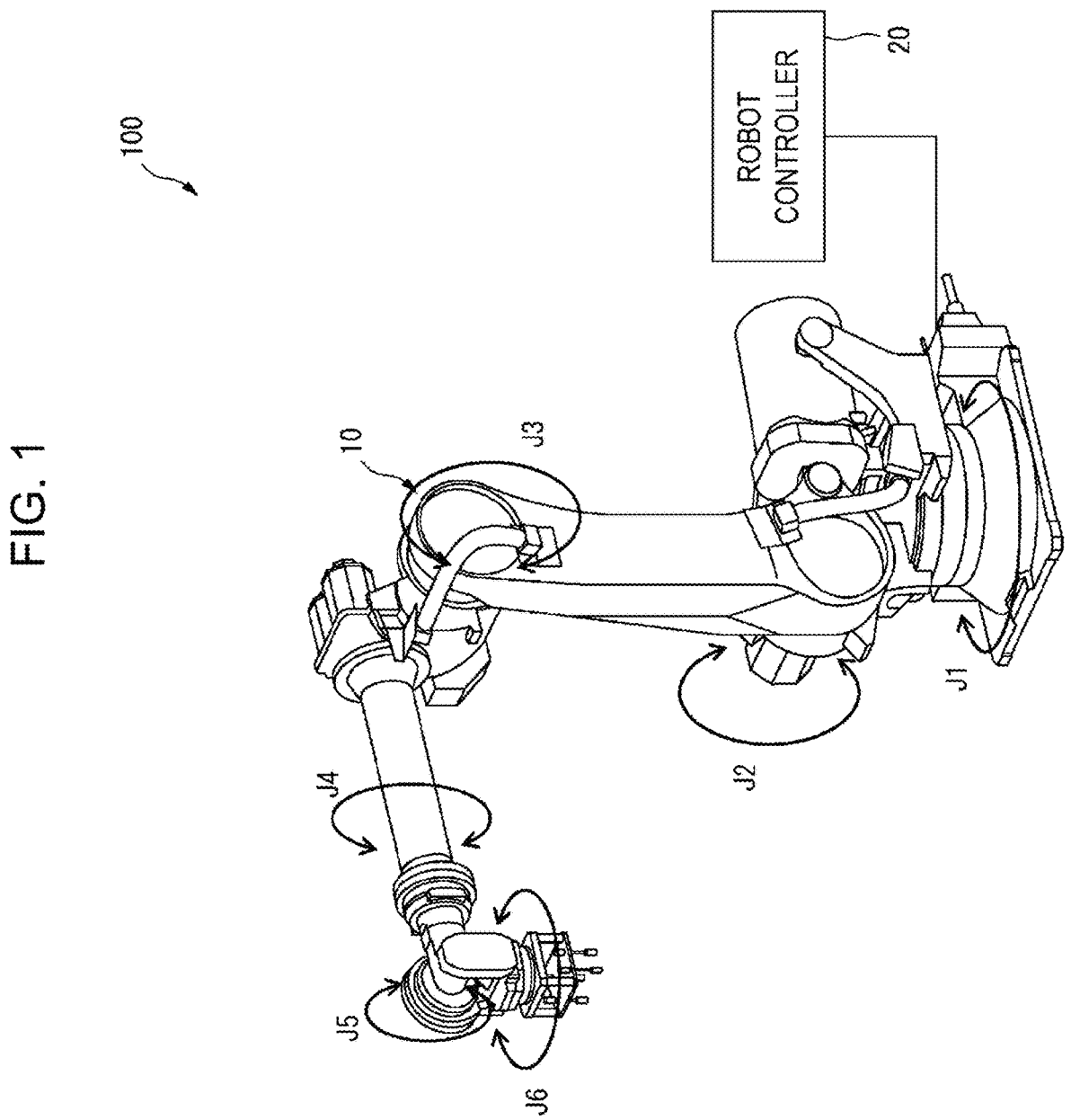
FIG. 1 is a diagram illustrating a configuration of a robot system including a robot controller according to an embodiment.

Next, an embodiment of the present disclosure will be described with reference to the drawings. In the drawings to be referenced, similar components or functional parts are denoted by the same reference numerals. The drawings are appropriately scaled for ease of understanding. A form illustrated in the drawings is an example for carrying out the present invention and the present invention is not limited to the illustrated form.

Figure 2:
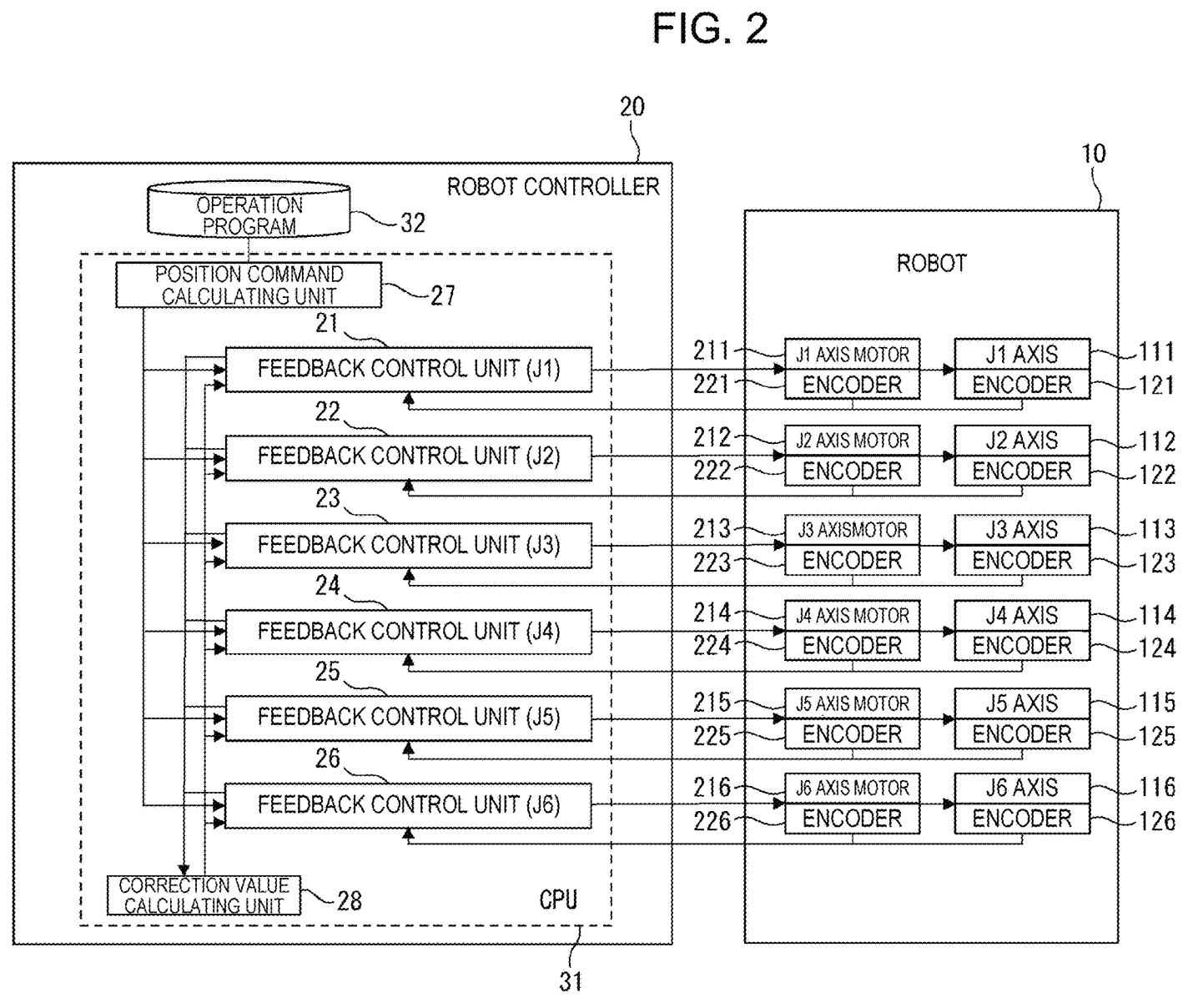

FIG. 1 is a diagram illustrating a configuration of a robot system 100 including a robot controller 20 according to an embodiment. FIG. 2 is a functional block diagram of the robot controller 20 and a robot 10. As will be described in detail below, the robot controller 20 executes appropriate control while taking into account a case where articulated axes of the robot are in a corotation relationship, through feedback control under a full-closed control scheme.

As illustrated in FIG. 1, the robot system 100 includes the robot 10 and the robot controller 20. The robot 10 is a 6-axis vertical articulated robot in the present embodiment. Another type of robot may be used as the robot 10. The robot controller 20 controls the operation of the robot 10, according to an operation program. The robot controller 20 may have a configuration as a general computer including a CPU, a ROM, a RAM, a storage device, an operation section, a display section, an input/output interface, a network interface, and the like. A teaching device (not illustrated) may be connected to the robot controller 20.

As illustrated in FIG. 1, the robot 10 is a 6-axis robot and includes six articulated axes (hereinafter, also simply referred to as axes) that are J1 to J6 axes. The J1 to J6 axes can each rotate as indicated by a corresponding one of the arrows in FIG. 1. The robot 10 includes an encoder that is provided to each axis to serve as a detector that detects the position (angle) of the axis. With this configuration, the robot 10 can perform feedback control under the full-closed control scheme based on the detected position (detected angle) of each axis.

Figure 5:
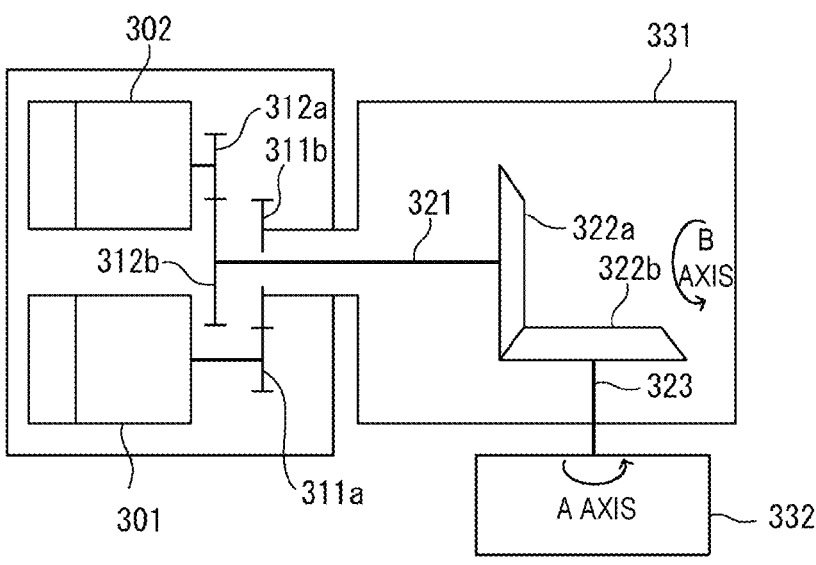
FIG. 5 is a diagram illustrating an example of a configuration of robot arms in a corotation relationship, illustrated as Reference Example.

In a robot including a plurality of axes, due to the arm structure, some of the plurality of axes may be in a corotation relationship, meaning that rotation one of such axes causes rotation of another one of such axes. In this specification, the corotation relationship is assumed to include any of the cases where rotation of at least one of a plurality of axes causes rotation of at least one of the other axes. An example of a configuration of robot arms in the corotation relationship will be described as Reference Example with reference to FIG. 5. The robot arms illustrated in FIG. 5 include a first arm 331 and a second arm 332. A mechanism of such robot arms is used as a mechanism for an arm tip portion of an articulated robot for example. A servomotor 301 drives a B axis (corotation causing axis), and a servomotor 302 drives an A axis (corotated axis). When the servomotor 301 rotates, the first arm 331 rotates via gears 311a and 311b. Thus, the rotation of the B axis is controlled by the rotation of the servomotor 301. When the servomotor 302 rotates, an axis 321 rotates via gears 312a and 312b, and an axis 323 rotates via bevel gears 322a and 322b, resulting in rotation of the second arm 332. Thus, the rotation of the A axis is controlled by the rotation of the servomotor 302.

With this mechanism, the first arm 331 and the second arm 332 are connected to each other, meaning that the rotation of the first arm 331 about the B axis causes the rotation of the bevel gear 322b, causing the rotation of the second arm 332 about the A axis (i.e., corotation). Thus, the rotation of the servomotor 301 causes the rotation of the B axis involving the rotation of the first arm 331, causing the corotation of the second arm 332 about the A axis.

For convenience of understanding of the control on the axes under the full-closed control scheme taking into account the corotation according to the present embodiment, a Reference Example of a semi-closed control scheme using an encoder that detects the position (rotation angle)/speed of the motor and a typical full-closed control scheme using an encoder that detects the position of an arm (each axis) will be described with reference to FIG. 4A and FIG. 4B.

Figure 4A:
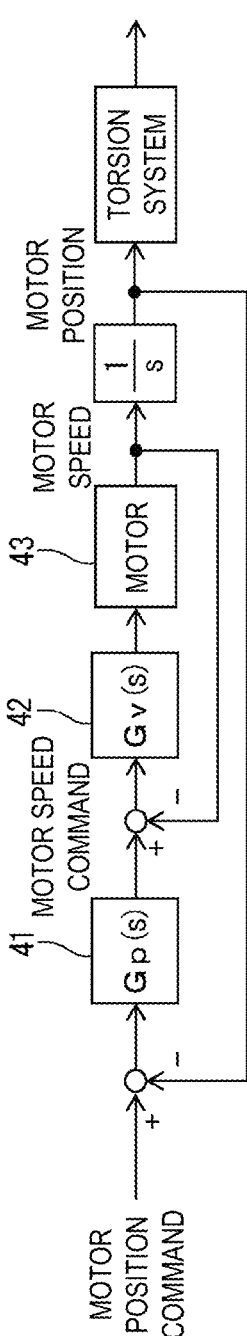
FIG. 4A is a block diagram of a feedback control circuit for a typical semi-closed control scheme, illustrated as Reference Example.

FIG. 4A illustrates a block diagram of a feedback control circuit for the semi-closed control scheme. As illustrated in FIG. 4A, a motor position command is input as a command to the feedback control circuit of the semi-closed control scheme. The motor position command is converted into a motor speed command by a position control unit 41 (Gp(s)).

A speed control unit 42 (Gv(s)) outputs a command (such as a current command) for controlling a motor 43 according to the speed command. Note that in FIG. 4A (and also in other block diagrams), a robot mechanism is described as a "torsion system". In the feedback control circuit of FIG. 4A, the motor speed is controlled by the feedback control of a minor loop, and the position control unit 41 executes the control by using a difference between a feedback signal of the motor position and the motor position command.

Figure 4B:
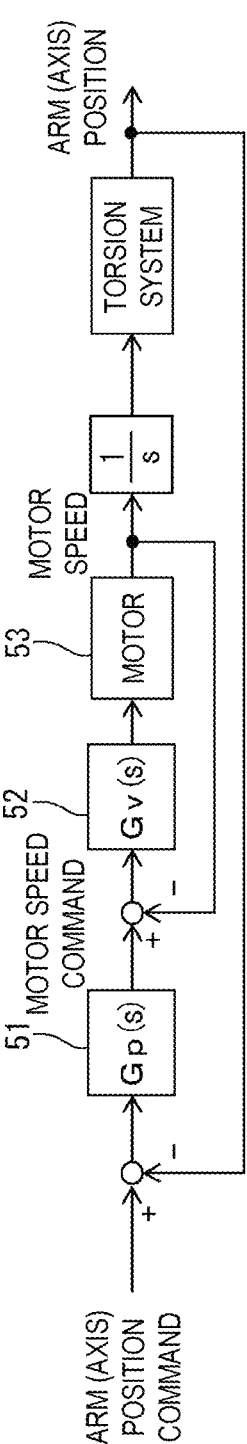
FIG. 4B is a block diagram of a feedback control circuit for a typical full-closed control scheme, illustrated as Reference Example.

FIG. 4B illustrates a feedback control circuit for a typical full-closed control scheme. In the feedback control circuit of FIG. 4B, an arm (axis) position command is provided as a command, and a position control unit 51 (Gp(s)) converts the arm position command into a motor speed command. A speed control unit 52 (Gv(s)) outputs a command (such as a current command) to control the motor 53, according to the motor speed command. In the feedback control circuit of FIG. 4B, the motor speed is controlled by the feedback control of a minor loop, and the position control unit 51 executes the control by using a difference between a feedback signal of the arm (axis) position and the arm (axis) position command. It should be understood that the typical full-closed control scheme in FIG. 4B relates to a configuration in which the control is performed based only on the motor speed of a single motor 53 provided to the control target axis, meaning that the corotation relationship in which the position of the control target axis also depends on other axes is not taken into consideration.

The full-closed control scheme implemented by the robot controller 20 according to the present embodiment while taking into account the corotation will be described below with reference to FIG. 2 and FIG. 3. As illustrated in FIG. 2, the robot controller 20 includes a storage unit 32 configured to store an operation program and other various types of information related to the control on the robot 10, a position command calculating unit 27 configured to calculate a position (angle) command for each axis for controlling the operation of the robot 10, through kinematic calculations according to the operation program, and feedback control units 21 to 26 configured to execute the feedback control under the full-closed control scheme respectively for the J1 to J6 axes.

The robot controller 20 further includes a correction value calculating unit 28 configured to calculate a correction value for the speed command for the corotated axis, based on the corotation relationship. The functional blocks of the robot controller 20 such as the position command calculating unit 27, the feedback control units 21 to 26, and the correction value calculating unit 28 may be implemented by a CPU 31 of the robot controller 20 executing various types of software, or may be implemented by a configuration mainly including hardware such as an Application Specific Integrated Circuit (ASIC).

The robot 10 includes a J1 axis 111, a J2 axis 112, a J3 axis 113, a J4 axis 114, a J5 axis 115, and a J6 axis 116, respectively provided with encoders 121 to 126 serving as axis position detectors that detect the axis position (angle). The encoders 121 to 126 may be, for example, optical rotary encoders. The axis position information is fed back from the encoders 121 to 126 to the feedback control units 21 to 26 respectively. The J1 axis to the J6 axis are respectively provided with motors 211 to 216 that are servomotors. The motors 211 to 216 are respectively provided with encoders 221 to 226 as motor position detectors that detect the rotation positions. The encoders 221 to 226 may be optical rotary encoders for example. The position information and the speed information on the motors are fed back from the encoders 221 to 226 to the feedback control units 21 to 26 respectively.

A description will be given on how the full-closed control scheme is implemented while taking into account the corotation relationship when the axes of the robot 10 are in the corotation relationship. In the 6-axis robot, the arm (axis) position and the motor position are respectively defined as $\theta_{Jn}$ (n=1, . . . , 6) and $\theta_{mn}$ (n=1, . . . , 6). With this definition, an arm position $\theta_{Jn}$ without the corotation is expressed as in Formula (1) below. Note that, in Formula (1), A, B, C, D, E, and F each represent a coefficient for converting the motor position $\theta_{mn}$ (n=1, . . . , 6) into the arm position $\theta_{Jn}$ qj(n=1, . . . , 6).

[Math. 1]

$$
\begin{bmatrix} \theta_{J1} \\ 0_{J2} \\ \theta_{J3} \\ \theta_{J4} \\ \theta_{J5} \\ \theta_{J6} \end{bmatrix} = \begin{bmatrix} A & & & & & \\ & B & & & 0 & \\ & & C & & & \\ & & & D & & \\ & 0 & & & E & \\ & & & & & F \end{bmatrix} \begin{bmatrix} \theta_{m1} \\ \theta_{m2} \\ \theta_{m3} \\ \theta_{m4} \\ \theta_{m5} \\ \theta_{m6} \end{bmatrix} \quad (1)
$$

In the above Formula (1), only the diagonal component in the right-side matrix is of a non-zero value, and anything other than the diagonal component is zero. Thus, the position of each of the axes depends only on the position of the motor for the axis. Thus, Formula (1) expresses a case where the axes are not in the corotation relationship.

The relationship between the arm position $\theta_{Jn}$ and the motor position $\theta_{mn}$ when there is the corotation relationship can be expressed as in Formula (2) below. In the right-side matrix of Formula (2), since there is a non-zero component other than the diagonal component, the position of a certain axis depends on the position of the motor provided to the axis, as well as the position of the motor provided to another axis. Note that if at least one of components other than the diagonal component is a non-zero component in the right-side matrix in Formula (2), the corotation relationship holds.

[Math. 2]

$$
\begin{bmatrix} \theta_{J1} \\ 0_{J2} \\ \theta_{J3} \\ \theta_{J4} \\ \theta_{J5} \\ \theta_{J6} \end{bmatrix} = \begin{bmatrix} A & & & & \text{NON-} & \\ & B & & & \text{ZERO} & \\ & & C & & & \\ & & & D & & \\ & \text{NON-} & & & E & \\ & \text{ZERO} & & & & F \end{bmatrix} \begin{bmatrix} \theta_{m1} \\ \theta_{m2} \\ \theta_{m3} \\ \theta_{m4} \\ \theta_{m5} \\ \theta_{m6} \end{bmatrix} \quad (2)
$$

As one example, a case is assumed where there is a corotation relationship in which the position of the J6 axis depends on the positions of the motors for the J4 axis and the J5 axis in the robot 10. In this case, the position of the J6 axis is expressed as in Formula (3) below. In the formula, $\alpha$ and $\beta$ represent coefficients indicating impacts by the positions of the respective motors for the J4 axis and the J5 axis, on the position of the J6 axis.

[Math. 3]

$$
\begin{bmatrix} \theta_{J1} \\ 0_{J2} \\ \theta_{J3} \\ \theta_{J4} \\ \theta_{J5} \\ \theta_{J6} \end{bmatrix} = \begin{bmatrix} A & & & & \text{NON-} & \\ & B & & & \text{ZERO} & \\ & & C & & & \\ & & & D & & \\ \text{NON-} & & & & E & \\ \text{ZERO} & & & \alpha & \beta & F \end{bmatrix} \begin{bmatrix} \theta_{m1} \\ \theta_{m2} \\ \theta_{m3} \\ \theta_{m4} \\ \theta_{m5} \\ \theta_{m6} \end{bmatrix} \quad (3)
$$

Thus, in the case of the above example, the position of the J6 axis is expressed as in the following Formula (4).

[Math. 4]

$$
\theta_{J6} = \alpha\theta_{m4} + \beta\theta_{m5} + F\theta_{m6} \quad (4)
$$

The above Formula (4) is modified into the following Formula (5) expressing the position (angle) of the motor 216 for the J6 axis.

[Math. 5]

$$
\theta_{m6} = \frac{\theta_{J6}}{F} - \frac{\alpha}{F}\theta_{m4} - \frac{\beta}{F}\theta_{m5} \quad (5)
$$

By differentiating both sides of the above Formula (5), the following Formula (6) is obtained expressing the speed of the motor 216 for the J6 axis.

[Math. 6]

$$
\frac{d\theta_{m6}}{dt} = \frac{1}{F} \cdot \frac{d\theta_{J6}}{dt} - \frac{\alpha}{F} \cdot \frac{d\theta_{m4}}{dt} - \frac{\beta}{F} \cdot \frac{d\theta_{m5}}{dt} \quad (6)
$$

In Formula (6), the second term and the third term on the right side are correction values (Formula (7) below) to be applied to the speed command for the motor 216 for the J6 axis when the corotation relationship as indicated by Formula (4) holds.

[Math. 7]

$$
(\text{CORRECTION VALUE}) = -\frac{\alpha}{F} \cdot \frac{d\theta_{m4}}{dt} - \frac{\beta}{F} \cdot \frac{d\theta_{m5}}{dt} \quad (7)
$$

When the corotation relationship as indicated by Formula (4) holds, the correction value calculating unit 28 calculates the correction value as in Formula (7), and applies the calculated correction value to the feedback control unit (the feedback control unit 26 in this case) for the control target axis. Also in a case of a corotation relationship other than that in the example described above, the correction value calculating unit 28 calculates the correction value based on the correspondence relationship (Formula (4) in the above example) between the position of the control target axis that rotates depending on the corotation relationship and the position of the motor corresponding to at least one axis that makes the control target axis corotate, as in the example described above.

Figure 3:
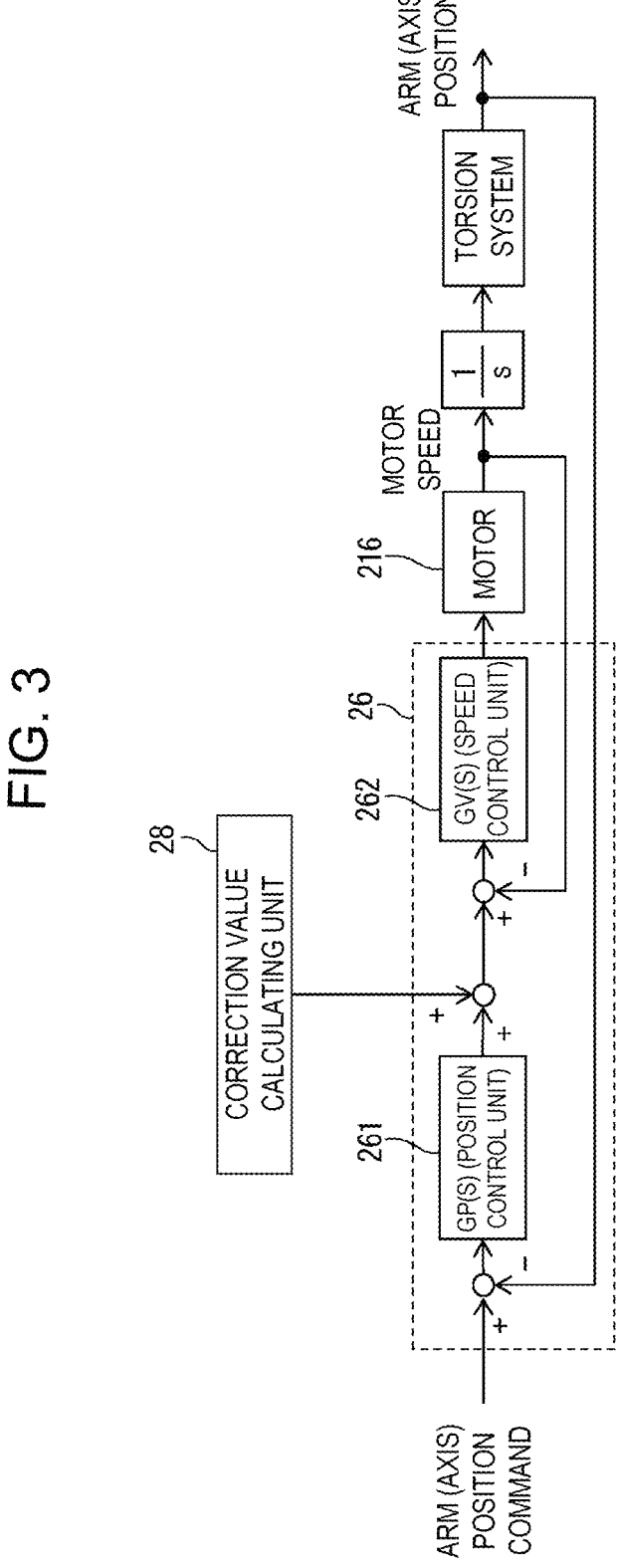
FIG. 3 is a block diagram of a feedback control circuit for a full-closed control scheme according the embodiment.

FIG. 3 is a block diagram illustrating feedback control under the full-closed control scheme for the J6 axis. The full-closed control scheme in FIG. 3 similarly applies to the other axes. As in the configuration illustrated in FIG. 4B, the feedback control circuit in FIG. 3 includes a position control unit 261 that calculates the speed command for the motor 216 based on the arm (axis) position command, and a speed control unit 262 that outputs a drive signal for driving the motor 216 according to the speed command. The position control unit 261 and the speed control unit 262 in FIG. 3 correspond to the feedback control unit 26 for the J6 axis in FIG. 2.

In the feedback control circuit in FIG. 3, the motor speed is controlled by the feedback control of a minor loop, and the position control unit 261 executes the control by using a difference between the arm position command and the axis position fed back. When the J6 axis is in the corotation relationship as expressed by the above Formula (4), the motor speed correction value as a correction value (Formula (7)) calculated by the correction value calculating unit 28 is added to the speed command value output from the position control unit 261, whereby the speed command is corrected. Thus, the speed control is implemented for the J6 axis while taking into account the corotation relationship. With this configuration, the feedback control unit 26 for the J6 axis can perform the speed control based on the speed command corrected based on the correction value calculated by the correction value calculating unit 28.

As described above, according to the present embodiment, even when axes of a robot are in the corotation relationship, the control taking into account the corotation relationship can be applied to the control for the control target axis, whereby the performance of the robot arm position control can be improved. In particular, the dynamic performance is improved for a case where a robot arm is operated with control performed on a plurality of axes including axes in the corotation relationship.

While the present invention has been described above by using typical embodiments, it is to be understood that those skilled in the art can make changes, various other modifications, omissions, and additions to each of the above embodiments without departing from the scope of the present invention.

The coefficients A to F, α, β, and the like between each of the axis positions and each of the motor positions described in the above embodiment may be stored in the storage unit 32 of the robot controller 20 in advance, or may be settable by the user using an operation section (not illustrated) of the robot controller 20. Alternatively, these coefficients may be input to the robot controller 20 from an external apparatus.

The configuration of the above embodiment can be applied to various machines including axes in a corotation relationship.

The functional configuration of the robot controller 20 illustrated in FIG. 2 is merely an example, and may be modified in various ways. For example, in the configuration example illustrated in FIG. 2, the robot controller 20 includes one correction value calculating unit 28, and the correction value calculating unit 28 calculates the correction value to be applied to the control on the control target axis, and the control value is applied to the feedback control unit for the control target axis. Instead of such a configuration, a configuration where each of the feedback control units 21 to 26 includes a function of the correction value calculating unit that calculates the correction value may be employed.

REFERENCE SIGNS LIST

10 ROBOT
20 ROBOT CONTROLLER
21 TO 26 FEEDBACK CONTROL UNIT

27 POSITION COMMAND CALCULATING UNIT
28 CORRECTION VALUE CALCULATING UNIT
31 CPU
32 STORAGE UNIT
100 ROBOT SYSTEM
111 J1 AXIS
112 J2 AXIS
113 J3 AXIS
114 J4 AXIS
115 J5 AXIS
116 J6 AXIS
121 TO 126 ENCODER
211 TO 216 MOTOR
221 TO 226 ENCODER
261 POSITION CONTROL UNIT
262 SPEED CONTROL UNIT

The invention claimed is:

1. A controller configured to control an operation of a machine including a plurality of joint axes in a corotation relationship in which a rotation of one of the plurality of joint axes causes a rotation of another one of the plurality of joint axes, the controller comprising:

a first encoder arranged at each of the plurality of joint axes and configured to detect a position of a corresponding joint axis of the plurality of joint axes;

a second encoder configured to detect a position of each of a plurality of motors configured to drive the plurality of joint axes, respectively; and a processor configured to calculate a position command for each of the plurality of joint axes, in accordance with an operation program, output a speed command for each of the plurality of motors corresponding to the plurality of joint axes, based on the position command and the detected position of each of the plurality of joint axes, control each of the plurality of motors based on the corresponding speed command, and calculate a correction value for correcting, based on the corotation relationship, the speed command for one of the plurality of motors corresponding to a control target joint axis that is a joint axis, among the plurality of joint axes, rotating depending on the corotation relationship so that the speed command is corrected based on the corotation relationship with other one or more motors, among the plurality of motors, corresponding to other one or more joint axes, among the plurality of joint axes, that rotate in association with driving of the control target joint axis, wherein the correction value is calculated based on a relationship between a position of the control target joint axis and a position of at least one motor, among the plurality of motors, corresponding to a joint axis of the plurality of joint axes that causes a corotation of the control target joint axis, the processor is configured to, based on the correction value, correct the speed command for, among the plurality of motors, a motor corresponding to the control target joint axis, and apply the corrected speed command to control the motor corresponding to the control target joint axis, the machine is an articulated robot having the plurality of joint axes, and the corotation relationship is represented by a transformation matrix between $\theta_{Jn}$ (n=1, . . . ) and $\theta_{mn}$ (n=1, . . . ), wherein $\theta_{Jn}$ (n=1, . . . ) denotes positions of the plurality of joint axes, and $\theta_{mn}$ (n=1, . . . ) denotes positions of the plurality of motors.

2. A controller configured to control an operation of a machine including a plurality of axes in a corotation relationship in which rotation of one of the plurality of axes causes rotation of another one of the plurality of axes, the controller comprising:

a first encoder configured to detect a position of each of the plurality of axes;

a second encoder configured to detect a position of each of a plurality of motors configured to drive the plurality of axes, respectively; and a processor configured to calculate a position command for each of the plurality of axes, in accordance with an operation program, output a speed command for each of the plurality of motors corresponding to the plurality of axes, based on the position command and the detected position of each of the plurality of axes, control each of the plurality of motors based on the corresponding speed command, and calculate a correction value for correcting, based on the corotation relationship, the speed command for one of the plurality of motors corresponding to a control target axis that is an axis, among the plurality of axes, rotating depending on the corotation relationship, wherein the processor is configured to, based on the correction value, correct the speed command for, among the plurality of motors, a motor corresponding to the control target axis, and apply the corrected speed command to control the motor corresponding to the control target axis, in a case where the machine is a 6-axis robot, the control target axis is a sixth axis, a corotation relationship holds in which a position of the sixth axis depends on positions of motors, of the plurality of motors, corresponding to a fourth axis and a fifth axis respectively, the corotation relationship is defined as:

$$\theta_{J6}=\alpha\theta_{m4}+\beta\theta_{m5}+F\theta_{m6}$$

where $\theta_{J6}$ represents the position of the sixth axis, $\theta_{m4}$, $\theta_{m5}$, and $\theta_{m6}$ respectively represent the positions of motors, of the plurality of motors, corresponding to the positions of the fourth axis to the sixth axis, and $\alpha$, $\beta$, and F are coefficients, and the processor is configured to calculate the correction value by:

$$(CORRECTION\ VALUE) = -\frac{\alpha}{F}\cdot\frac{d\theta_{m4}}{dt} - \frac{\beta}{F}\cdot\frac{d\theta_{m5}}{dt}.$$

3. A robot system, comprising:

a controller configured to control an operation of a machine including a plurality of joint axes in a corotation relationship in which a rotation of one of the plurality of joint axes causes a rotation of another one of the plurality of joint axes; and an articulated robot having a configuration of the machine and having the plurality of joint axes, wherein the controller comprises:

a first encoder arranged at each of the plurality of joint axes and configured to detect a position of a corresponding joint axis of the plurality of joint axes, a second encoder configured to detect a position of each of a plurality of motors configured to drive the plurality of joint axes, respectively, and a processor configured to calculate a position command for each of the plurality of joint axes, in accordance with an operation program;

output a speed command for each of the plurality of motors corresponding to the plurality of joint axes, based on the position command and the detected position of each of the plurality of joint axes;

control each of the plurality of motors based on the corresponding speed command; and calculate a correction value for correcting, based on the corotation relationship, the speed command for one of the plurality of motors corresponding to a control target joint axis that is a joint axis, among the plurality of joint axes, rotating depending on the corotation relationship so that the speed command is corrected based on the corotation relationship with other one or more motors, among the plurality of motors, corresponding to other one or more joint axes, among the plurality of joint axes, that rotate in association with driving of the control target joint axis, the correction value is calculated based on a relationship between a position of the control target joint axis and a position of at least one motor, among the plurality of motors, corresponding to a joint axis of the plurality of joint axes that causes a corotation of the control target joint axis, the processor is configured to, based on the correction value, correct the speed command for, among the plurality of motors, a motor corresponding to the control target joint axis, and apply the corrected speed command to control the motor corresponding to the control target joint axis, and the corotation relationship is represented by a transformation matrix between $\theta_{Jn}$ (n=1, . . . ) and $\theta_{mn}$ (n=1, . . . ), wherein $\theta_{Jn}$ (n=1, . . . ) denotes positions of the plurality of joint axes, and $\theta_{mn}$ (n=1, . . . ) denotes positions of the plurality of motors.

4. A controller, configured to control an operation of a machine including a plurality of joint axes in a corotation relationship in which a rotation of one of the plurality of joint axes causes a rotation of another one of the plurality of joint axes, the controller comprising:

a first encoder arranged at each of the plurality of joint axes and configured to detect a position of a corresponding joint axis of the plurality of joint axes;

a second encoder configured to detect a position of each of a plurality of motors configured to drive the plurality of respective joint axes, respectively; and a processor configured to calculate a position command for each of the plurality of joint axes, in accordance with an operation program, output a speed command for each of the plurality of motors corresponding to the plurality of joint axes, based on the position command and the detected position of each of the plurality of joint axes, control each of the plurality of motors based on the corresponding speed command, and calculate a correction value for correcting, based on the corotation relationship, the speed command for one of the plurality of motors corresponding to a control target joint axis that is a joint axis, among the plurality of joint axes, rotating depending on the corotation relationship, wherein the correction value is calculated based on a relationship between a position of the control target joint axis and a position of at least one motor, among the plurality of motors, corresponding to a joint axis of the plurality of joint axes that causes a corotation of the control target joint axis, the processor is configured to, based on the correction value, correct the speed command for, among the plurality of motors, a motor corresponding to the control target joint axis, and apply the corrected speed command to control the motor corresponding to the control target joint axis, the machine is an articulated robot having the plurality of joint axes, and the corotation relationship is represented by a transformation matrix between $\theta_{Jn}$ (n=1, . . . ) and $\theta_{mn}$ (n=1, . . . ), wherein $\theta_{Jn}$ (n=1, . . . ) denotes positions of the plurality of joint axes, and $\theta_{mn}$ (n=1, . . . ) denotes positions of the plurality of motors, wherein the articulated robot is a 6-axis robot having the plurality of joint axes being six joint axes, and the corotation relationship is defined by the following formula:

$$
\begin{bmatrix} \theta_{J1} \\ \theta_{J2} \\ \theta_{J3} \\ \theta_{J4} \\ \theta_{J5} \\ \theta_{J6} \end{bmatrix} = \begin{bmatrix} A & & & & & \\ & B & & & \text{NON-} & \\ & & & & \text{ZERO} & \\ & & C & & & \\ & & & D & & \\ & \text{NON-} & & & E & \\ & \text{ZERO} & & & & \\ & & & & & F \end{bmatrix} \begin{bmatrix} \theta_{m1} \\ \theta_{m2} \\ \theta_{m3} \\ \theta_{m4} \\ \theta_{m5} \\ \theta_{m6} \end{bmatrix}
$$

wherein $\theta_{Jn}$ (n=1, . . . , 6) denote the positions of first to sixth joint axes of the six joint axes, $\theta_{mn}$ (n=1, . . . , 6) denote the positions of first to sixth motors of the plurality of motors corresponding to the first to sixth joint axes, respectively, in the formula, the matrix other than $\theta_{Jn}$ (n=1, . . . , 6) and $\theta_{mn}$ (n=1, . . . , 6) is the transformation matrix, A, B, C, D, E, and F in the transformation matrix denote coefficients for transforming $\theta_{mn}$ (n=1, . . . , 6) to $\theta_{Jn}$ (n=1, . . . , 6), and at least one of components in the transformation matrix other than A, B, C, D, E, and F is a non-zero component.

* * * * *